(12) United States Patent
Nakata

(10) Patent No.: US 6,433,859 B1
(45) Date of Patent: Aug. 13, 2002

(54) DISTANCE MEASURING APPARATUS AND DISTANCE MEASURING METHOD

(75) Inventor: Koichi Nakata, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/714,836

(22) Filed: Nov. 16, 2000

(30) Foreign Application Priority Data

Nov. 17, 1999 (JP) .......................................... 11-327212

(51) Int. Cl.[7] .............................. G01C 3/00; G01C 3/08; G01C 5/00; G03B 13/34; G03B 3/10
(52) U.S. Cl. ....................................... 356/3.14; 396/123
(58) Field of Search ............................ 356/3.017, 5.15, 356/3.14; 396/121–124, 96

(56) References Cited

U.S. PATENT DOCUMENTS

| 4,768,054 A | * | 8/1988 | Norita et al. ................. 354/408 |
| 4,882,601 A | * | 11/1989 | Taniguchi et al. ........... 354/407 |
| 5,128,707 A | * | 7/1992 | Muramatsu .................. 354/408 |
| 5,204,714 A | * | 4/1993 | Nonaka et al. .............. 354/403 |
| 5,258,803 A | * | 11/1993 | Hayakawa .................... 354/402 |
| 5,296,888 A | * | 3/1994 | Yamada ........................ 354/402 |
| 5,426,482 A | * | 6/1995 | Tsuru ........................... 354/403 |
| 5,565,954 A | * | 10/1996 | Ishiguro ....................... 396/126 |
| RE35,652 E | * | 11/1997 | Nonaka et al. .............. 396/104 |
| 5,915,233 A | * | 6/1999 | Nonaka ........................ 702/158 |
| 6,035,138 A | * | 3/2000 | Egawa .......................... 396/106 |
| 6,157,783 A | * | 12/2000 | Ide ............................... 396/106 |
| 6,215,961 B1 | * | 4/2001 | Mukai et al. ................. 396/100 |

FOREIGN PATENT DOCUMENTS

| JP | 5-264887 | 10/1993 |
| JP | 7-199039 | 8/1995 |

* cited by examiner

Primary Examiner—Thomas H. Tarcza
Assistant Examiner—Brian K Andrea
(74) Attorney, Agent, or Firm—Straub & Pokotylo; John C. Pokotylo

(57) ABSTRACT

A distance measuring apparatus has a sensor, a monitor region selection portion, a distance measuring portion, and a detection portion. The sensor photoelectrically converts the subject image to output a subject image signal corresponding to the luminance distribution. The monitor region setting portion sets the monitor region at the time of integration of the above sensor. The distance measuring calculation portion calculates the distance measurement with respect to the region including the monitor region set with the monitor region setting portion. The detection portion detects a region low in luminance and low in contrast based on the above subject image signal. The monitor region setting portion sets as the second monitor region the low luminance and low contrast region detected with the detection portion out of the first monitor region set at the first time. The sensor conducts the first integration and the second integration corresponding to the first and the second monitor regions set with the monitor region setting portion.

24 Claims, 9 Drawing Sheets

DISTANCE MEASURING APPARATUS AND DISTANCE MEASURING METHOD

CROSS-REFERENCE TO RELATED APPLICATIONS

This application is based upon and claims the benefit of priority from the prior Japanese Patent Application No. 11-327212, filed Nov. 17, 1999, the entire contents of which are incorporated herein by reference.

BACKGROUND OF THE INVENTION

The present invention relates to a distance measuring apparatus and a distance measuring method, and a passive style distance measuring apparatus and a distance measuring method which are adopted in a camera, a video camera or the like.

Conventionally, in the case where scenes are photographed against the background of a reverse light scene or a night scene with a camera provided with a passive style distance measuring apparatus, an integration operation is conducted by taking a high luminance portion and a light source at the background as a reference.

Consequently, there is a problem in that the background is focused in place of a person who is a main subject so that a person who is the main subject cannot be obtained in an appropriate state.

In order to solve such a disadvantage, for example, Jpn. Pat. Appln. KOKAI Publication No. 5-264887 discloses a technique for conducting an integration operation by detecting reverse light based on light measurement data and distance measurement sensor data, setting in a central portion of a photographing screen a monitor screen for monitoring subject luminance information used for integration control in the state of reverse light, and taking a region where integration speed is the slowest out of a plurality of monitors set in the central portion of the photographing screen or set in advance as a reference.

Furthermore, Jpn. Pat. Appln. KOKAI Publication No. 7-199039 discloses a technique characterized by providing a night scene mode for the night scene photography, judging as to whether auxiliary light is required at the time of a night scene mode, and emitting auxiliary light in the case of low luminance.

However, in the technique disclosed in Jpn. Pat. Appln. KOKAI Publication No. 5-264887, in the case where a high luminance portion at the background is a dot-like reflection light from a high reflection object, and in the case where the main subject such as a person or the like is present at the position other than the center of the photographing screen, the reverse light cannot be detected and furthermore, a signal associated with the main subject is saturated so that a main subject cannot be sufficiently obtained.

Furthermore, in the technique disclosed in Jpn. Pat. Appln. KOKAI Publication No. 7-199039, auxiliary light is not emitted in the case where the light source of the night scene is bright, and the light quantity of auxiliary light is not sufficient in the case where auxiliary light is emitted with the result that no effect is generated.

BRIEF SUMMARY OF THE INVENTION

An object of the present invention is to provide a distance measuring apparatus and a distance measuring method of a camera which is capable of measuring a distance of a main subject with certitude irrespective of a high luminance portion at the background.

In order to attain an object, according to a first aspect, there is provided a distance measuring apparatus comprising:

a sensor for photoelectrically converting a subject image to output a subject image signal corresponding to a luminance distribution;

a monitor region setting portion for setting a monitor region at the time of integration of the sensor;

a distance measuring calculation portion for calculating a distance measurement in correspondence to a region including the monitor region set with the monitor region setting portion; and a detection portion for detecting a region having a low luminance and a low contrast based on the subject image signal;

wherein the monitor region setting portion sets as a second monitor the low luminance and low contrast region detected with the detection portion region out of a first monitor region set at the first time, and the sensor conducts the first and the second integration in correspondence to the first and the second monitor regions set with the monitor region setting portion.

Furthermore, according to a second aspect of the present invention, there is provided a distance measuring apparatus comprising:

a sensor for photoelectrically converting a subject image to output a subject image signal corresponding to a luminance distribution;

a monitor region setting portion for setting a monitor region at the time of integration by the sensor;

a sensor data reading portion for reading sensor data at the time of integration by the sensor;

a detection portion for detecting a maximum value out of the sensor data read with the sensor data reading portion;

a calculation region setting portion for setting a region including the monitor region set with the monitor region setting portion as the calculation region;

a comparison portion for comparing the maximum value of the sensor data detected with the detection portion with a predetermined value; and a judgment portion for judging whether or not a low luminance and low contrast portion is present in the sensor data read with the sensor data reading portion in the case where the comparison portion obtains a comparison result showing that the maximum value of the sensor data is larger than the predetermined value;

wherein the monitor region setting portion sets as a second monitor region the low luminance and low contrast portion out of the first monitor region which is set at the first time in the case where the judgment portion judges the low luminance and low contrast portion is present in the sensor data, the sensor conducts the first and the second integration corresponding to the first and the second monitor regions set with the monitor region setting portion.

Furthermore, according to a third aspect of the present invention, there is provided a distance measuring method using a distance measuring apparatus for measuring a distance based on sensor data obtained by the integration control of a sensor, the method comprising the steps of:

conducting a first integration with a monitor region for the first integration, and a senor sensitivity for the first integration;

conducting a first calculation based on the first sensor data obtained with the first integration;

detecting a low luminance and low contrast region based on the first sensor data;

setting the low luminance and low contrast region detected in the detection as a monitor for the second integration to conduct the second integration with the monitor region for the second integration and the sensor sensitivity for the second integration;

conducting a second calculation based on the second sensor data obtained with the second integration; and selecting desired data from the calculation data calculated in the first and the second calculation.

Furthermore, according to a fourth aspect of the present invention, there is provided a distance measuring method using a distance measuring apparatus for determining a subject distance based on the sensor data obtained by the integration control of the sensor, the method comprising the steps of:

conducting a first integration with a monitor region for the first integration, and a senor sensitivity for the first integration;

calculating subject distance data through the first calculation based on the first sensor data obtained from the first integration;

detecting a low luminance and low contrast region based on the first sensor data;

setting the low luminance and low contrast region detected in the detection as a monitor region for the second integration to conduct a second integration with the monitor region for this second integration and the sensor sensitivity for the second integration;

calculating the subject distance data with the second calculation based on the second sensor data obtained in the second integration; and selecting desired data from the subject distance data calculated with the first and the second calculation as distance measuring data.

Furthermore, according to a fifth aspect, there is provided a distance measuring apparatus comprising:

a sensor for photoelectrically converting a subject image to output a subject image signal corresponding to a luminance distribution;

an integration region setting portion for setting the integration region of the sensor;

a distance measuring calculation portion for calculating the distance measurement corresponding to a region including an integration region set with the integration region setting portion; and a detection portion for detecting a low luminance and low contrast region based on the subject image signal output from the sensor;

wherein the integration region setting portion sets as a second integration region the low luminance and low contrast region detected with the detection portion out of the first integration region set at the first time; and the sensor conducts the first and the second integration in correspondence to the first and the second integration region set with the integration region setting portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
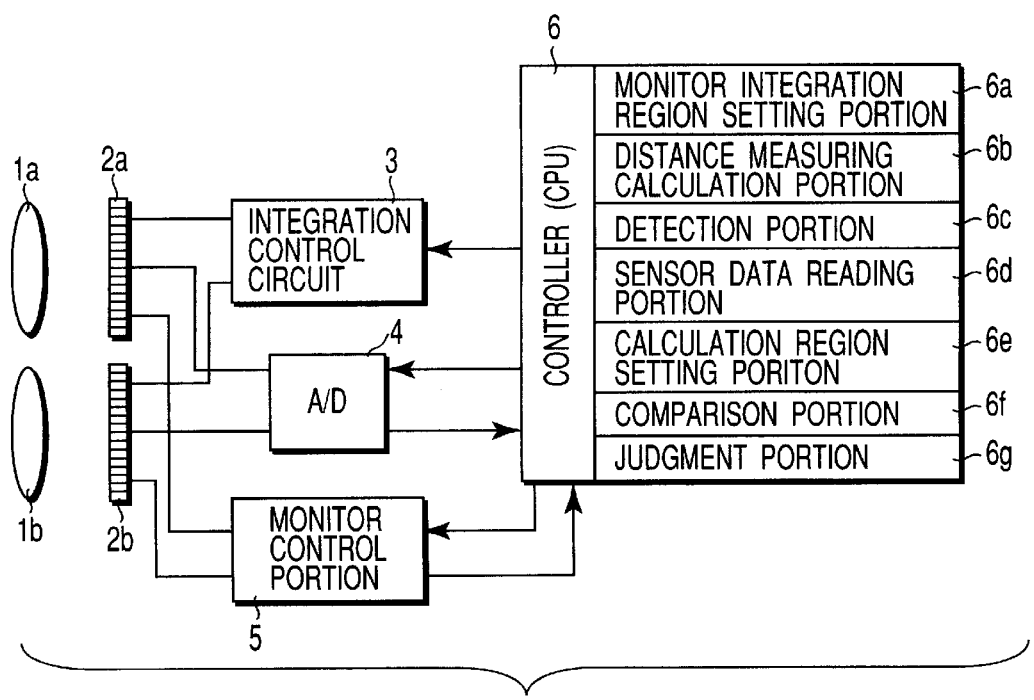
FIG. 1 is a block diagram showing a structure of a distance measuring apparatus according to a first embodiment of the present invention.

Reference will now be made in detail to the presently preferred embodiments of the invention as illustrated in: the accompanying drawings, in which like reference numerals designate like or corresponding parts.

Hereinafter, embodiments of the present invention will be explained by referring to the drawings.

First Embodiment

First, a distance measuring apparatus and a distance measuring method according to a first embodiment will be explained.

FIG. 1 is a view showing a structure of a distance measuring apparatus according to the first embodiment of the present invention.

As shown in FIG. 1, a pair of light receiving lenses 1a and 1b are arranged on this distance measuring apparatus.

On the rear portion of these light receiving lenses 1a and 1b, a pair of line sensors 2a and 2b are arranged on each of the light axes of the light receiving lenses 1a and 1b.

Then, an output of the pair of line sensors 2a and 2b is connected to an input of an A/D conversion circuit 4 and an input of a monitor control circuit 5 respectively.

Outputs of these A/D conversion circuit 4 and monitor conversion circuit 5 are connected to an input of a CPU 6.

Furthermore, an output of this CPU 6 is connected to an input of the line sensors 2a and 2b respectively via an integration control circuit 3.

In such a structure, a subject image is formed on the pair of line sensors 2a and 2b with the pair of light receiving lenses 1a and 1b.

Then, on the pair of line sensors 2a and 2b, a formed subject image is photoelectrically converted in accordance with the light intensity to be converted into an electric signal.

At this time, the integration operation of the pair of line sensors 2a and 2b is controlled with the integration control circuit 3.

An analog electric signal which has photoelectrically converted the subject image output from the pair of line sensors 2a and 2b is A/D converted with the A/D conversion circuit 4 to be sent to the controller (CPU) 6 as a digital signal.

Furthermore, the subject luminance information in the integration operation is monitored with a monitor control circuit 5, so that the setting of the monitor region and a monitor signal are output to the controller (CPU) 6.

Here, the controller (CPU) 6 conducts various calculations such as an output of each control signal and calculation of the subject distance.

Here, the controller (CPU) 6 has a monitor region selection portion 6a, a distance measuring calculation portion 6b, and a detection portion 6c.

The pair of line sensors 2a and 2b photoelectrically converts the subject image to output the subject image signal corresponding to a luminance distribution.

That is, the monitor region setting portion 6a sets the monitor region at the time of integration of the pair of line sensors 2a and 2b.

The distance measuring calculation portion 6b conducts distance measuring calculation corresponding to a region including a monitor region set with the monitor region setting portion 6a.

The detection portion 6c detects a low luminance and low contrast region based on the subject image signal.

The monitor region setting portion 6a sets as the second monitor region the low luminance and low contrast region detected with the detection portion 6c out of the first monitor region set at the first time.

The above pair of line sensors 2a and 2b conducts the first and the second integration corresponding to the first and the second monitor regions set with the above monitor region setting portion 6a.

Furthermore, the controller (CPU) 6 has a monitor region setting portion 6a, a sensor data reading portion 6b, a detection portion 6c, a calculation region setting portion 6e, a comparison portion 6f, and a judgment portion 6g.

In this case as well, the pair of line sensors 2a and 2b photoelectrically converts the subject image to output the subject image signal corresponding to the luminance distribution.

That is, the monitor region setting portion 6a sets the monitor region at the time of integration by the pair of line sensors 2a and 2b.

The sensor data reading portion 6d reads the sensor data at the time of integration by the pair of line sensors 2a and 2b.

The above detection portion 6c detects the maximum value from the sensor data read with the sensor data reading portion 6d.

The calculation region setting portion 6e set as a calculation region a region including the monitor region set with the monitor region setting portion 6a.

The comparison portion 6f compares the maximum value of the sensor data detected with the detection portion 6c with the predetermined value.

The judgment portion 6g judges whether or not a region having a low luminance and low contrast portion is present in the sensor data read with the sensor data reading portion in the case where the comparison portion 6f obtains a comparison result showing that the maximum value of the sensor data is larger than the predetermined value.

The monitor region setting portion 6a sets as the second monitor region a region having the low luminance and low contrast region out of the first monitor region set at the first time in the case where the judgment portion 6g judges that the region having a low luminance and low contrast portion is present in the sensor data.

The pair of line sensors 2a and 2b conduct the first and the second integration corresponding to the first monitor region and the second monitor region set with the monitor region setting portion 6a.

Figure 4:
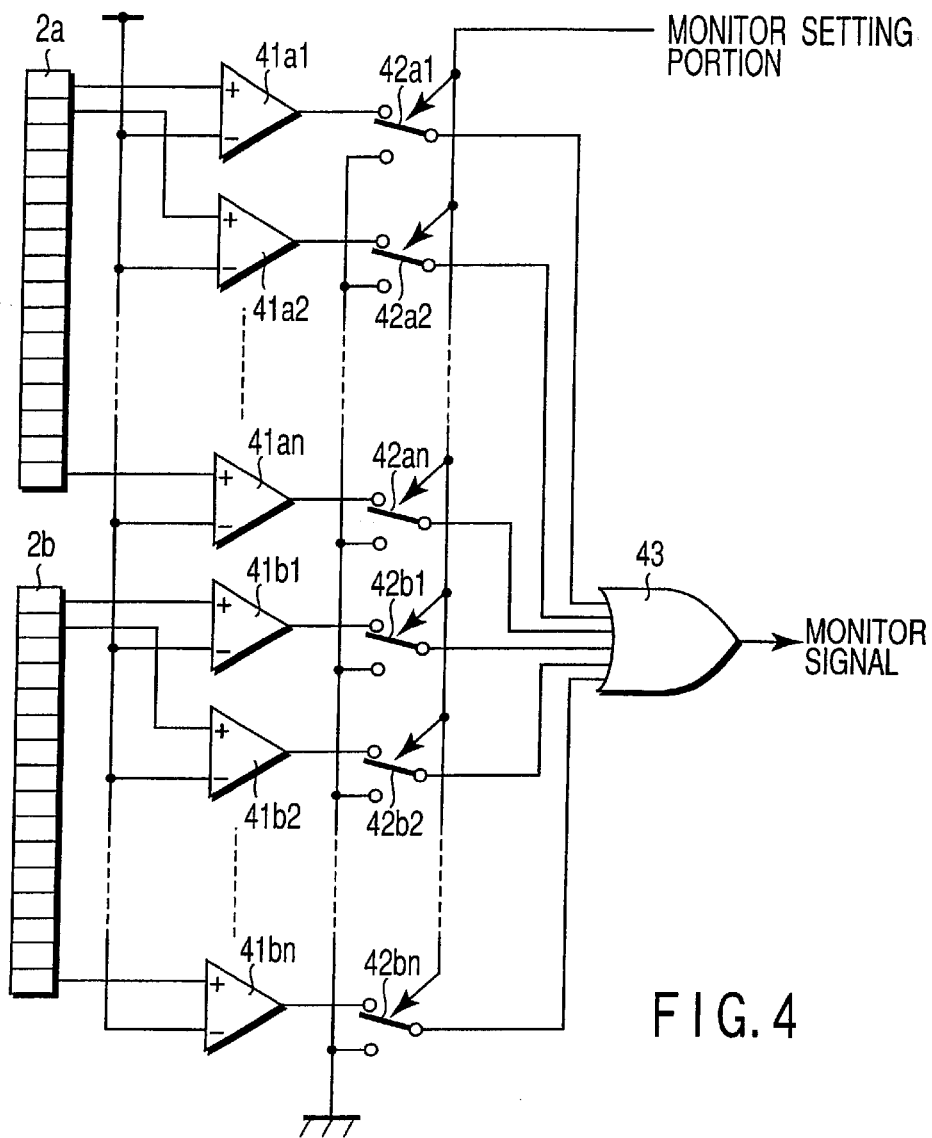
FIG. 4 is a block diagram showing a structure example of a monitor control circuit 5 of the distance measuring apparatus according to the first embodiment of the present invention.

FIG. 4 is a block diagram showing a constitution structure of the monitor control circuit 5 of the distance measuring apparatus according to the first embodiment of the present invention.

As shown in FIG. 4, an output of the line sensor 2a is connected to one end of the reverse input terminal of the comparators 41a1 through 41an.

The outputs of the comparators 41athrough 41an are connected to one end of the switches 42a1 through 42an.

In the same manner, the output of the line sensor 2b is connected to the reverse input terminal of the comparators 41b1 through 41bn.

The outputs of the comparators 41b1 through 41bn are connected to one end of the switches 42b1 through 42bn.

The terminals of the comparators 41a1 through 41an and 41b1 through 41bn are connected to the reference voltage VREF.

Then, the other ends of the switches 42al through 42an and 42b1 through 42bn are connected to each input of the multiple input OR circuit 43.

In such structure of a monitor control circuit 5, in the pair of line sensors 2a and 2b the subject image formed with the pair of light receiving lenses 1a and 1b is photoelectrically converted in accordance with the light intensity to be converted into an electric signal.

In the comparators 41al through 41an and 41b1 through 41bn, in the case where the integration voltage input from each of line sensors 2a and 2b becomes the reference voltage VREF or less, a H (high) level monitor is output.

The switches 42a1 through 42an and 42b1 through 42bn are controlled with the CPU 6 of FIG. 1. At the time of the monitor setting, the outputs of the comparators 41a1 through 41an and 41b1 through 41bn and the OR circuit 43 are connected.

Then, in the OR circuit 43, in the case where the integration voltage of any one of the sensors set at the monitor becomes the reference voltage VREF or less, the H (High) level monitor signal is output.

The distance measuring apparatus and the distance measuring method according to this first embodiment are characterized in that an arbitrary region of the line sensor is set to the monitor region for monitoring the luminance of the subject under a structure shown in FIGS. 1 and 4.

Figure 2A:
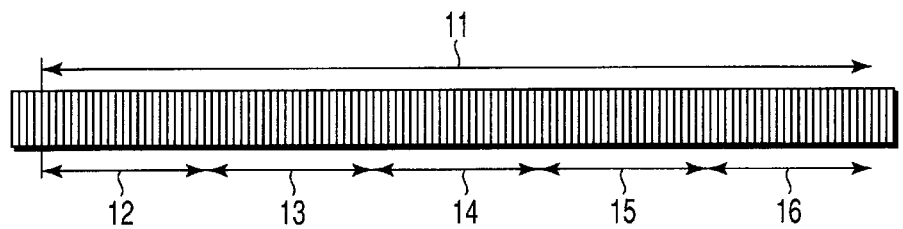
FIGS. 2A, 2B and 2C are views showing one example of a monitor and a calculation region in a distance measuring apparatus according to the first embodiment of the present invention.
Figure 2B:
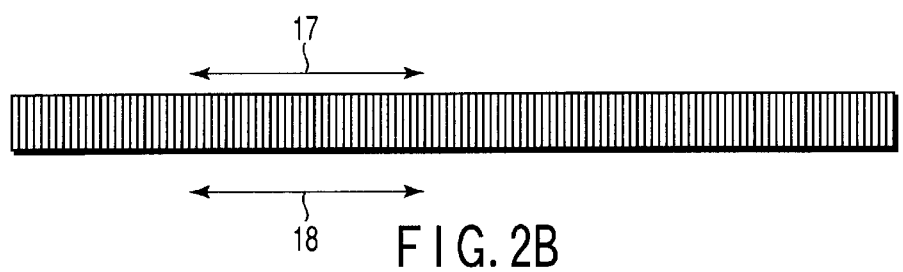
Figure 2C:
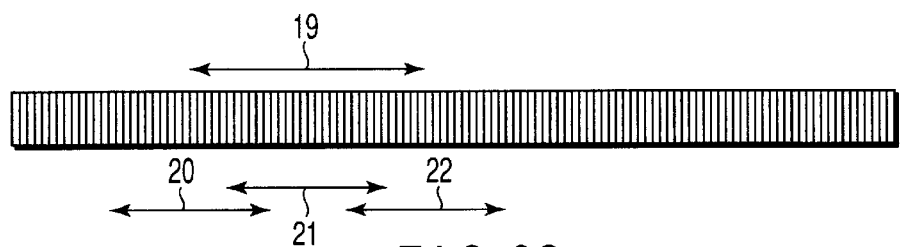

FIGS. 2A to 2C are views showing a setting example of a monitor and a calculation portion according to a distance measuring apparatus and a distance measuring method according to the first embodiment.

In other words, FIG. 2A is a view showing a setting example of the monitor region 11 at the time of the first integration, and a setting example of the first calculation regions 12 through 16.

Furthermore, there are shown a setting example of the monitor region 17 at the time of the second integration, and a setting example of the second calculation region 18.

In addition, FIG. 2C is a view showing a setting example of the monitor region 19 at the time of the second integration and a setting example of the second calculation regions 20 through 22.

Figure 3A:
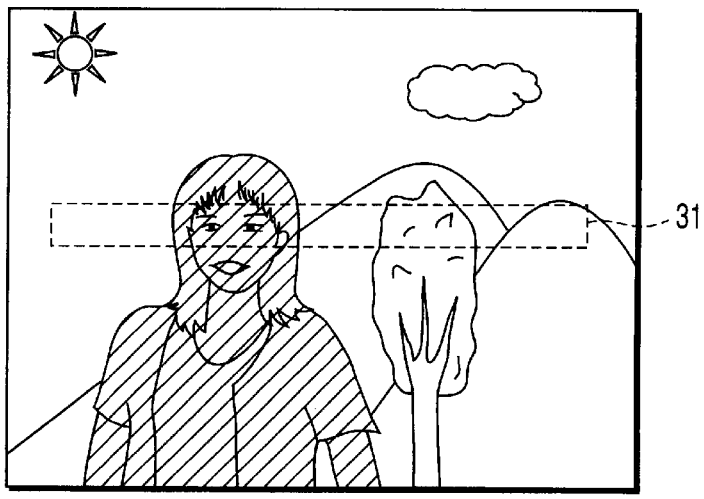
FIGS. 3A, 3B and 3C are views showing one example of a photographing scene and a subject image data with a distance measuring apparatus according to the first embodiment of the present invention.
Figure 3B:
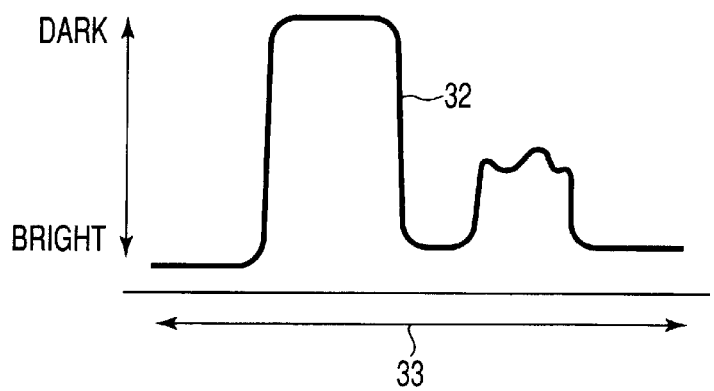
Figure 3C:
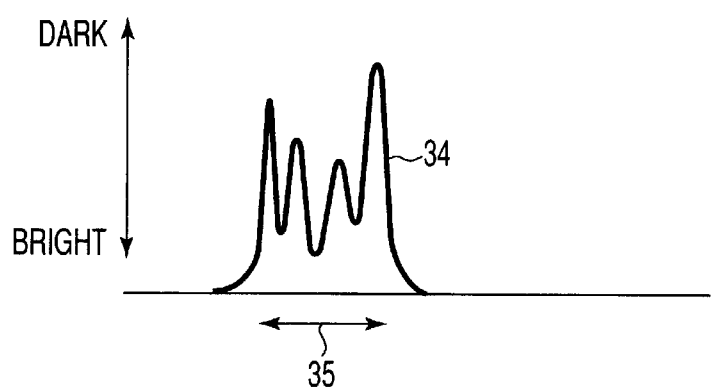

FIGS. 3A to 3C are views showing one example of a photographing scene and subject image data according to the distance measuring apparatus and the distance measuring method according to the first embodiment.

That is, FIG. 3A is a view showing a scene in which a person who is a main subject becomes a low luminance against the background because of reverse light.

In FIG. 3A, reference numeral 31 of a portion surrounded with a frame shown by a dot line corresponds to a range of distance measurement in the photographing screen.

In FIG. 3B, reference numeral 32 denotes the subject image data by the first integration.

In addition, reference numeral 33 denotes a monitor region set at the time of the first integration.

In FIG. 3C, reference numeral 34 denotes the subject image data through the second integration.

Furthermore, reference numeral 35 denotes a monitor region at the second integration set based on the subject image data 32 by through the first integration.

Next, an outline of a distance measurement operation in the distance measuring apparatus and a distance measuring method according to the first embodiment of the present invention will be explained by referring to FIGS. 2A, 2B, 2C, 3A, 3B and 3C.

In the beginning, as shown in FIG. 2A, the monitor region 11 is set in a wide range on the line sensor, so that the integration operation is conducted (hereinafter referred to as the first integration).

Then, based on the sensor data obtained in the first integration, the subject distance data is determined for each of the calculation regions 12 through 16 shown in FIG. 2A (hereinafter referred to as the first calculation).

Data to be used in the photography is normally selected by a predetermined selection method such as the nearest selection or the like out of the subject distance data determined in each of the calculation regions 12 through 16.

Then, in the distance measurement in the reverse light scene shown in FIG. 3A, suppose that the monitor region 33 as shown in FIG. 3B is set and the first integration is conducted with the result that the image of the person who is the main subject has a relatively low luminance and a low contrast against the background like the sensor data 32.

In this case, as shown in FIG. 3C, the monitor region 35 is set to a region which has had a low luminance and a low contrast in the first integration to conduct integration (hereinafter referred to as the second calculation).

Next, based on the sensor data 34 as shown in FIG. 3C which is obtained in the second integration, the calculation region 18 is set in the region same as the set monitor region 17 as shown in FIG. 2B so that the subject distance data is determined (hereinafter referred to as,the second calculation).

Then, data to be used for photography is selected with a predetermined selection method such as the nearest selection or the like from the data by the first calculation and the data by the second calculation.

The second calculation region may be set to the regions 20 through 22 so as to include the monitor region 19 in the second integration.

In the case where the low luminance and low contrast region of the sensor data obtained in the first integration is narrower than the predetermined range, the subject is present in a far distance when the subject is a person, so that the subject distance data can be determined in the first calculation.

Furthermore, in the case where the subject is not a person, the subject actually has a low luminance and a low contrast. Consequently, no effect can be provided even when the second integration is conducted.

Consequently, in this case, the second integration is not conducted.

Figure 5A:
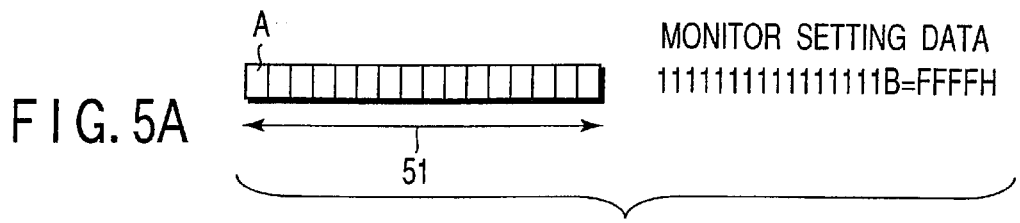
FIGS. 5A and 5B are views showing a setting example of a monitor region in the distance measuring apparatus according to the first embodiment of the present invention.
Figure 5B:
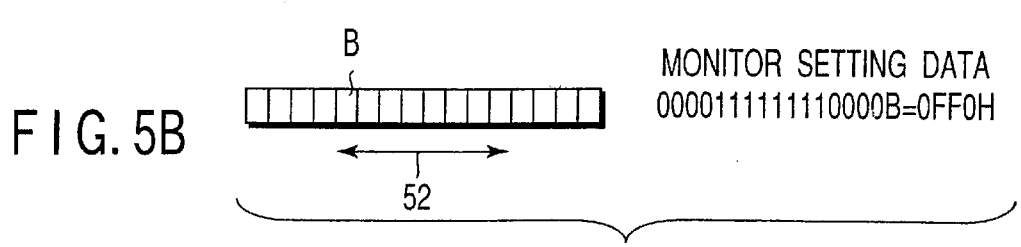

FIGS. 5A and 5B are views showing a setting example of the monitor region by the distance measuring apparatus and the distance measuring method according to the first embodiment.

That is, FIG. 5A is a view showing a monitor region 51 at the time of the first integration.

Besides, FIG. 5B is a view showing a monitor region 52 at the time of the second integration.

Reference numeral A in FIG. 5A denotes a head sensor of the monitor region at the time of the first integration.

Furthermore, reference numeral B in FIG. 5B denotes a head sensor of the monitor region at the time of the second integration.

As shown in FIGS. 5A and 5B, 1 is set to a bit corresponding to the sensor set in the monitor of the monitor setting data.

Incidentally, the details of these settings will be described later.

Next, a procedure of the distance measuring sequence will be explained in detail according to the distance measuring apparatus and the distance measuring method according to the first embodiment of the present invention by referring to the flowchart of FIG. 6.

In the beginning, the monitor region for the first integration will be set (step S101).

That is, as shown in FIG. 5A, in the case where all the sensors are set to the monitor when the number of the line sensors (2a, 2b) is 16, 1 is set to each bit of the monitor setting data by taking the sensor of reference A in FIG. 5A as a reference (monitor setting data=FFFFH).

Furthermore, in the case where eight sensors in the center are set, as shown in FIG. 5B, 1 is set to 8 bits portion of the monitor setting data by taking the sensor denoted reference number B in FIG. 5B as a reference (monitor setting data=0FF0H).

This data is transmitted to the monitor control circuit 5 from the CPU 6 by means of serial communication or the like.

The monitor control circuit 5 sets the monitor region by controlling the switches 42a1 through 42an and 42b1 through 42bn shown in FIG. 4 based on this data.

Subsequently, the sensor sensitivity of the first integration will be set based on the light measuring data and the previous integration result or the like (step S102).

The sensor sensitivity may be switched in two stages of a low sensitivity and a high sensitivity. Alternatively the sensitivity may be switched in multiple stages exceeding the two stages.

Next, the first integration is conducted in the monitor region and sensor sensitivity set at steps S101 and S102 (step S103).

Incidentally, the control of this integration may be such that the integration is terminated by detecting the H (high) level output of the monitor signal from the monitor control circuit 5 shown in FIG. 4. Instead an integration voltage to be output may be evaluated in the CPU 6 by using monitor means in which the integration voltage of the sensor having the fastest integration speed out of the sensors of the monitor regions is output as a monitor signal so that the integration is completed.

Subsequently, the subject image signal through the first integration is A/D converted at the A/D conversion circuit 4 of FIG. 1 and the signal is read into the RAM not shown in the CPU 6 as the sensor data (step S104).

At this time, the maximum value MAX (sensor data in which the darkest portion is integrated) of the sensor data is detected.

Next, the predetermined calculation regions 12 through 16 as shown in 2A are set (step S105).

At this time, the set region is not restricted thereto. It goes without saying that the number of regions and the range thereof and the like may be changed depending upon the specifications of the camera, the photographing condition, the mode and the like.

Subsequently, the subject distance data is determined by a predetermined correlation calculation, interpolation calculation, or the like for each of the calculation regions set at step S105 (step S106).

Then, in the case where the maximum value MAX of the sensor data detected at step S104 is larger than the predetermined value, the process proceeds to step S108. In the case where the maximum value MAX is smaller than the predetermined value, judgment is made that no low luminance portion is present in the sensor data to proceed to step S116 (step S117).

Subsequently, judgment is made as to whether a low luminance and low contrast portion is present in the sensor data obtained in the first integration at step S103 (step S108).

Then, as a result of judgment at step S108, in the case where the low luminance and low contrast portion is present, the process proceeds to step S110. When no low luminance and low contrast portion is present, the process proceeds to step S116 (step S109).

At the subsequent step S110, the monitor region for the second integration is set based on the judgment result of step S108.

That is, in the distance measurement of reverse light shown in FIG. 3A, the monitor region is set to the range 35 shown in FIG. 3C in the case where the sensor data 32 is obtained, as shown in FIG. 3B, in which the image of the person which is the main subject becomes low in luminance and low in contrast in the first integration in which the monitor region is set to the range 33.

In the setting of the monitor region, in the same manner as explained at the previous step S101, 1 is set to the bit of the monitor setting data corresponding to the monitor region 35, so that this data is transferred to the monitor control circuit 5 with the CPU6 shown in FIG. 1.

The monitor control circuit 5 sets the monitor region by controlling the switches 42a1 through 42an and 42b1 through 42bn shown in FIG. 4 based on this data.

Subsequently, the sensor sensitivity of the second integration is set based on the maximum value MAX of the sensor data detected at the above step S104 and the average value or the like of the low luminance and low contrast portion detected at the above step S108 (step S111).

Then, the second integration is conducted in the monitor region and at the sensor sensitivity set at the above steps S110 and S111 (step S112). Incidentally, the control of integration is the same as in the step S103.

Subsequently, the subject image signal by the second integration is A/D converted at the A/D conversion circuit 4 of FIG. 1, and is read into the RAM not shown in the CPU6 as the sensor data (step S113).

The sensor data to be read may be the data of all the sensors, or may be only the sensor data of the second calculation region set at step S114.

Next, the calculation region for conducting the second calculation is set (step S114)

The region set here may be set to the region same as the monitor region 17 as shown in FIG. 2B, or a plurality of regions 20 through 22 may be set to the monitor region 19 as shown in FIG. 2C.

Subsequently, the subject distance data is determined by means of a predetermined correlation calculation, interpolation calculation or the like for each of the calculation regions set a the above step S114 (step S115).

Then the subject distance data is selected which is used for photography by means of the nearest distance selection or the like from the subject distance data determined at the above steps S106 and S115 (step S116).

Figure 7:
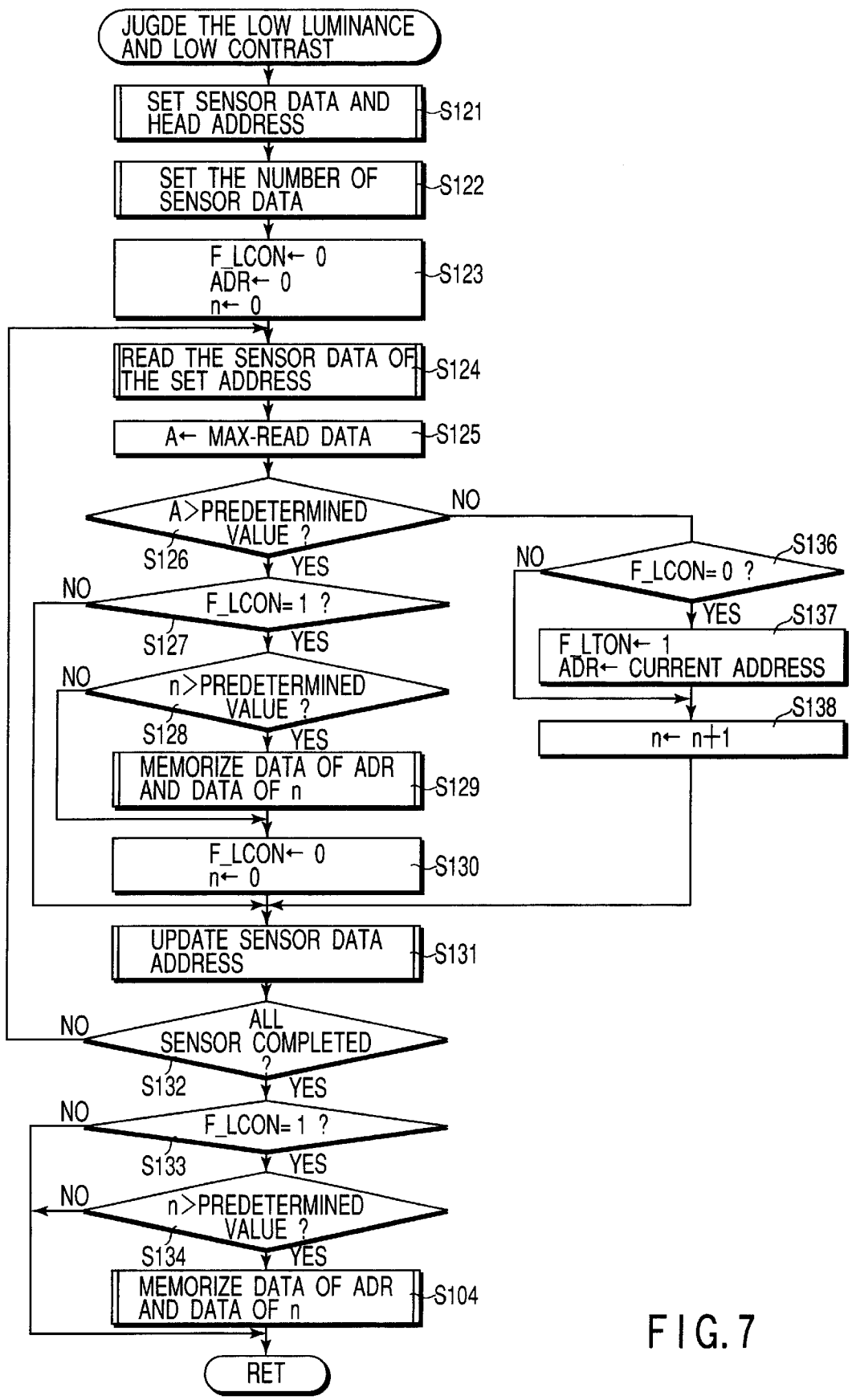
FIG. 7 is a flowchart for explaining a procedure of a low luminance and low contrast judgment sequence in the distance measuring apparatus according to the first embodiment of the present invention.

Next, by referring to the flowchart of FIG. 7, there will be explained a procedure of a low luminance and low contrast judgment sequence by the distance measuring apparatus and the distance measuring method according to the first embodiment of the present invention.

In the beginning, the head RAM address of the sensor data is set which data is stored in the RAM of the CPU 6 (step S121).

Subsequently, the number of sensor data items stored in the RAM of the CPU 6 is set (step S122).

Then, the F_LCON (the low contrast flag), the ADR (the head address data of the low luminance and low contrast region), and n (the number of sensors of low luminance and low contrast region) are cleared (step S123).

Subsequently, the sensor data of the RAM address currently set is read (step S124).

Then, the difference between the maximum value MAX of the sensor data detected at step S104 and the sensor data read at step S124 is stored in A (step S125).

Subsequently, the low contrast is judged (step S126).

Then, A determined at step S125 is larger than the predetermined value, judgment is made that the contrast is not low to proceed to step S127. When A is smaller, judgment is made that the contrast is low to proceed to step S136.

Next, judgment is made as to whether the previous sensor data has the low contrast (step S127).

Here, when the F_LCON=1 is established, judgment is made that the contrast is low to proceed to step S128. When F_LCON=0 is established, judgment is made that the contrast is not low to proceed to step S131.

Subsequently, judgment is made as to whether the low contrast region is wider than the predetermined range (step S128).

Here, when the number n of sensors in the low luminance and low contrast region is larger than the predetermined number, judgment is made that the low contrast region is wide to proceed to step S129. When the number is smaller, judgment is made that the region is narrow to proceed to step S130.

Next, the data of the head address ADR of the low luminance and low contrast region and the data of the sensor number n of the low luminance and low contrast regions are memorized as the low luminance and low contrast and low contrast region (step S129).

Next, the F_LCON and the sensor number n of the low luminance and low contrast regions are cleared (step S130).

Then, the RAM address of the sensor data to be subsequently read is set (step S131).

Furthermore, judgment is made as to whether the low contrast judgment is completed with respect to all the sensor data (step S132).

Here, when the judgment is completed, the process proceeds to step SS133. When the judgment is not completed, the process returns to step S124.

Subsequently, judgment is made as to whether the last sensor data has the low contrast (step S133).

Here, when the F_LCON=1 is established, judgment is made that the contrast is low to proceed to step S134. When the F_LCON=0 is established, judgment is made that the contrast is not low to return.

Next, judgment is made as to whether the last low contrast region is wider than the predetermined range (step S134).

When this n is larger than the predetermined value, judgment is made that the region is wide to proceed to step S135. When the n is smaller than the predetermined value, judgment is made that the region is narrow to return.

At step S135, in the same manner as in step S129, the ADR data and the data of n are memorized as a low luminance and low contrast region data.

When step S126 is branched to N, judgment is made at step S136 as to whether or not the previous sensor data has a low contrast.

Here, when F_LCON=0 is established, judgment is made that the contrast is not low to proceed to step S137. When F_LCON=1 is established, judgment is made that the contrast is low to proceed to step S138.

Next, F_LCON is set, and the RAM address of the current sensor data is set as the head address of the low luminance and low contrast region to be stored in the ADR (step S137).

Then, at step S138, 1 is added to the sensor number n of the low luminance and low contrast regions.

As has been described above, according to the first embodiment of the present invention, even in the case where the main subject becomes low in luminance against the background as can be seen in the case of reverse light, a sufficient contrast can be obtained, so that the main subject can be measured at a high precision.

Furthermore, since the relatively low luminance and relatively low contrast portion is detected to set the monitor region, the distance can be measured accurately even in the case where the main subject is present in a portion other than the center of the photographing screen.

Second Embodiment

Next, a second embodiment of the present invention will be explained hereinbelow.

A structure of this second embodiment is the same as the structure of the first embodiment.

Figure 8A:
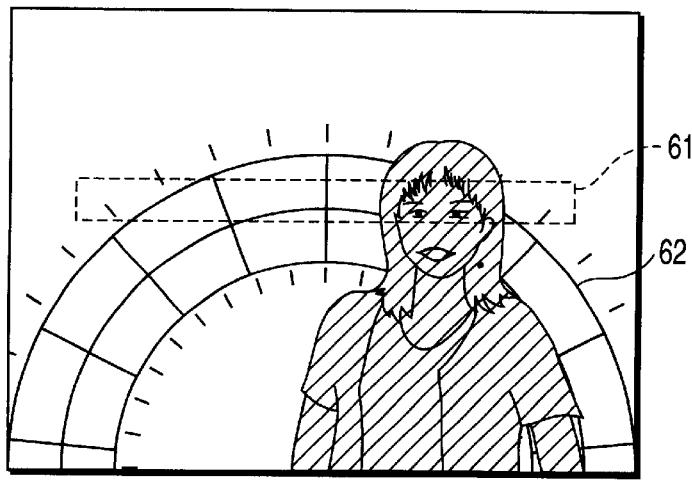
FIGS. 8A, 8B and 8C are views showing an example of a photographing scene and a subject image data in the distance measuring apparatus according to a second embodiment of the present invention.

In this second embodiment, it is considered as to whether the auxiliary light is required in the distance measurement of the scene in which night scene as shown in FIG. 8A is used as a background.

Furthermore, the monitor region is set by selecting one or a plurality of monitor regions from a plurality of small blocks, so that low luminance and low contrast judgment is for each of the small blocks.

Incidentally, the small blocks may be arbitrarily set with the software in the CPU 6, or the blocks may be constituted with the software in the monitor circuit.

Furthermore, it goes without saying that the small blocks are set in such a manner that the range of the blocks partially overlap the adjacent blocks.

Figure 8B:
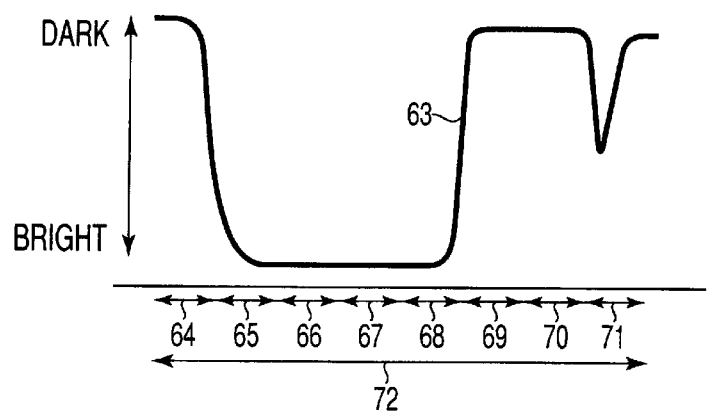
Figure 8C:
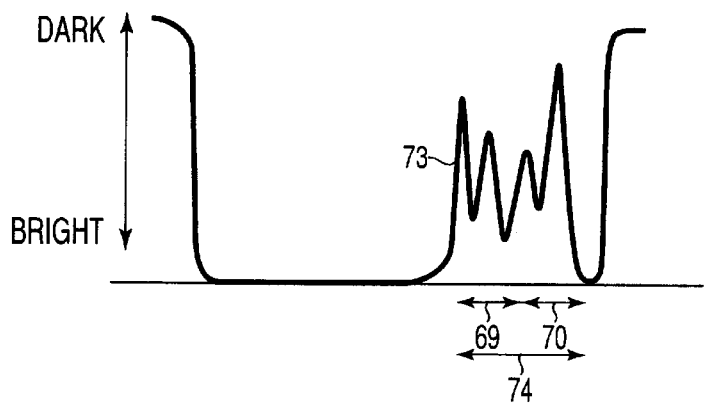

Here, FIGS. 8A, 8B and 8C are views showing an example of the photographing scene and the subject data with the distance measuring apparatus according to the second embodiment of the present invention.

That is, FIG. 8A is a view showing one example of a photographing scene against the background of the night scene.

In FIG. 8A, reference numeral 61 denotes a distance measuring range in the photographing screen.

Furthermore, reference numeral 62 denotes a light source constituting a night scene such as electric decoration or the like.

Furthermore, FIG. 8B is a view showing subject image data by the first integration.

In FIG. 8B, reference numerals 64 through 71 denote small blocks for the setting of the monitor region.

Furthermore, reference numeral 72 denotes a monitor region comprising blocks 64 through 71 set at the time of the first integration.

Then, FIG. 8C is a view showing subject image data 73 by the second integration.

In FIG. 8C, reference numeral 74 denotes a monitor region at the time of the second integration comprising small blocks 69 and 70 set based on the subject image data 73 by the first integration.

Figure 9:
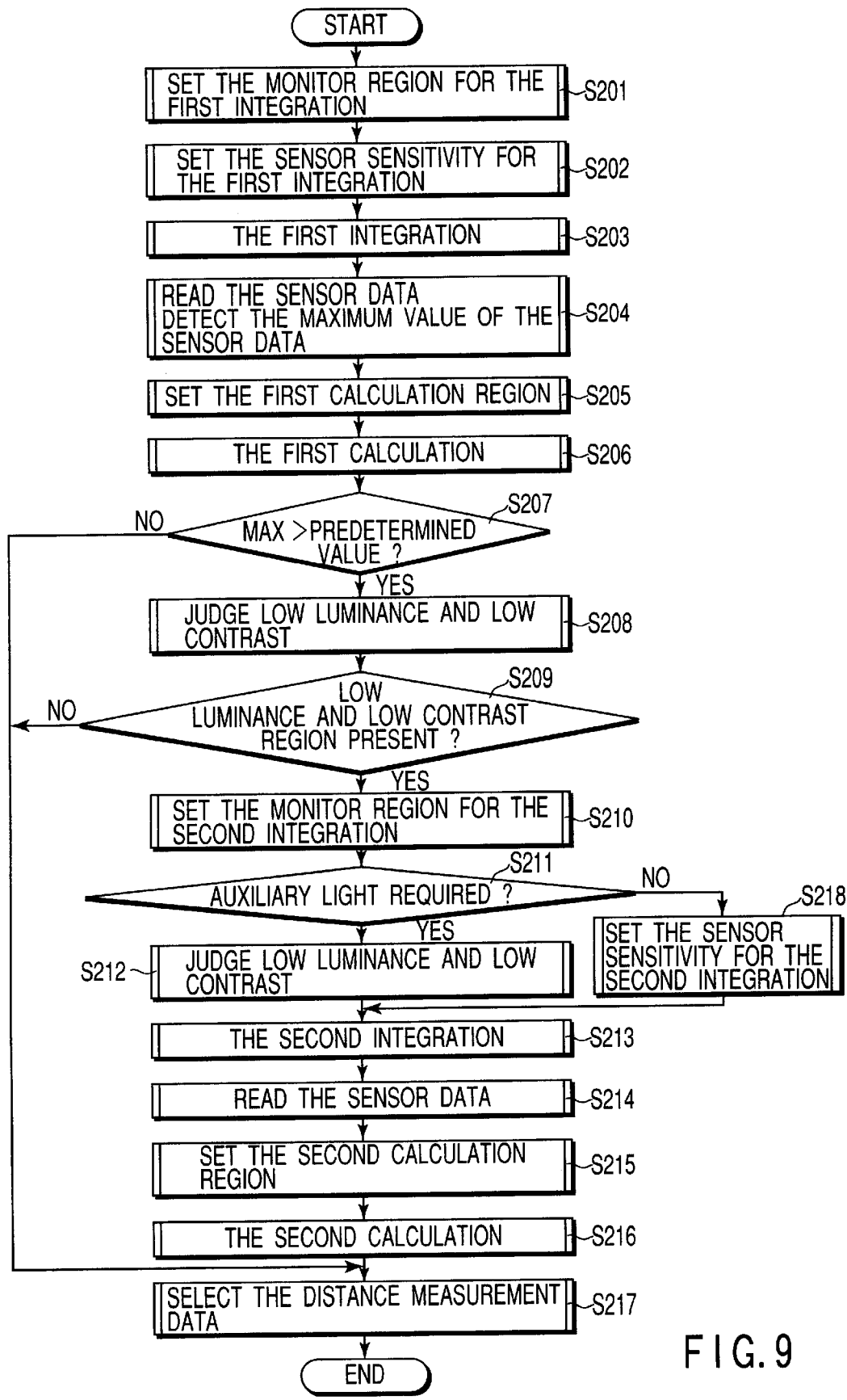
FIG. 9 is a flowchart for explaining a procedure of a distance measuring sequence in the distance measuring apparatus according to the second embodiment of the present invention.

Hereinafter, a procedure of a distance measuring sequence by the distance measuring apparatus according to the second embodiment will be explained by referring to the flowchart of FIG. 9.

In the beginning, the monitor region for the first integration is set (step S201).

That is, as shown in FIG. 5A, in the case where all the blocks are set in the monitor when the number of small blocks for the setting a monitor region is 16, the block denoted by symbol A in FIG. 5A is taken as a reference so that 1 is set to each bit of the monitor setting data (monitor setting data=FFFFH).

Besides, in the case where eight blocks in the center is set to the monitor region, as shown in FIG. 5B, 1 is set to eight bit portions of monitor setting data by taking the block denoted by the reference symbol B in FIG. 5B as a reference (monitor setting data=0FF0H).

This data is transmitted to the monitor control circuit 5 with the CPU 6 shown in FIG. 1 by means of the serial communication.

The monitor control circuit 5 sets the monitor region by controlling the switches 42$a$1 through 42$an$ and 42$b$1 through 42$bn$ shown in FIG. 4 based on this data.

Figure 6:
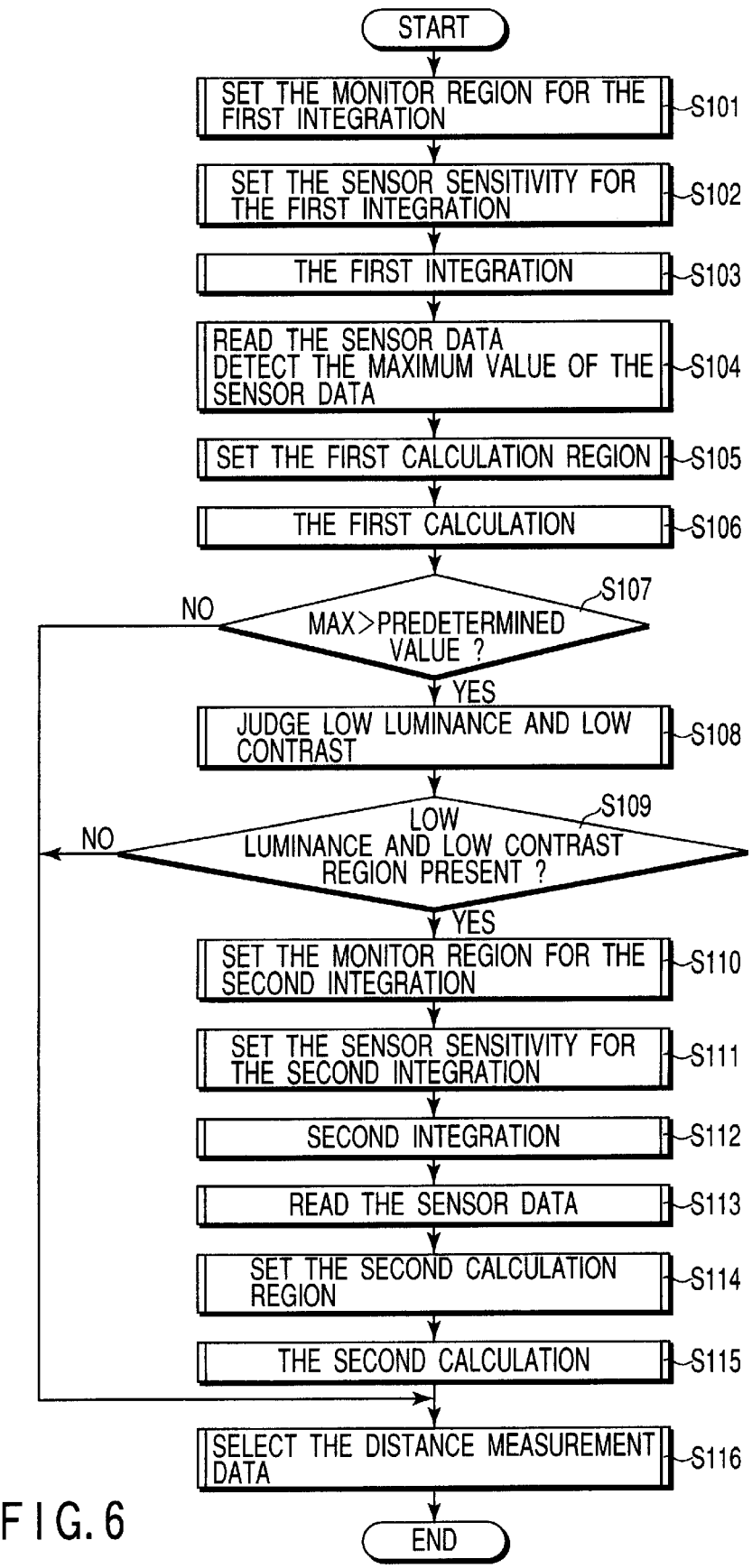
FIG. 6 is a flowchart for explaining in detail a procedure of a distance measuring sequence in the distance measuring apparatus according to the first embodiment of the present invention.

At subsequent steps S202 through S207, the processing similar to the processing at steps S102 through S107 in FIG. 6 is conducted, so that detailed explanation thereof is omitted here.

Next, at step S208, judgment is made as to whether the low luminance and low contrast portion is present in the sensor data obtained by the first integration at step S203 for each of the small block for setting the monitor region.

At the subsequent step S209, the processing similar to the processing at step S109 in FIG. 6 is conducted.

Next, based on the judgment result at step S208, the monitor region for the second integration is set (step S210).

In other words, in the distance measurement of the night scene as shown in FIG. 8A, as shown in FIG. 8B, in the case where the sensor data 63 is obtained where a person image which is the main subject has a low luminance and a low contrast in the first integration in which the range of the monitor region is set to the range 72, the small blocks 69 and 70 where the image becomes low in luminance and contrast are set as the monitor region 74 as shown in FIG. 8C.

In the setting of the monitor region, in the same manner as explained above at the previous step S201, 1 is set to a bit of the monitor setting data corresponding to the small blocks 69 and 70 set as the monitor region 74, and this data is transmitted to the monitor control circuit 5 with the CPU 6 shown in FIG. 1. Then, the monitor region is set by the control of the switches 42$a$1 through 42$an$ and 42$b$1 through 42$bn$ shown in FIG. 4 based on this data.

Subsequently, judgment is made as to whether the auxiliary light is required (step S211).

In this case, the auxiliary light may be a strobe, an LED, a lamp, or the like.

In the beginning, judgment is made based on the minimum value MIN of the sensor data in the monitor region 74 for the second integration which value is determined at step S208.

In this judgment, the average value such as the sensor data of the monitor region 74 may be used.

Then, the sensor sensitivity at the time of the auxiliary light integration is set (step S212).

Here, in the beginning, judgment is made based on the minimum value MIN of the sensor data in the monitor region 74 for the second integration which value is determined at step S208.

It goes without saying that the average value or the like of the sensor data of the monitor region 74 may be used.

Subsequently, in the beginning, the second integration is conducted in the monitor region designated at step S210 and at the sensor sensitivity set at step S212 or step S218 (step S213).

The control of this integration is the same as the control in the first embodiment.

At steps S214 through S218, the processing is conducted which is the same as the steps S114 through S118 of FIG. 6 showing the first embodiment.

Figure 10:
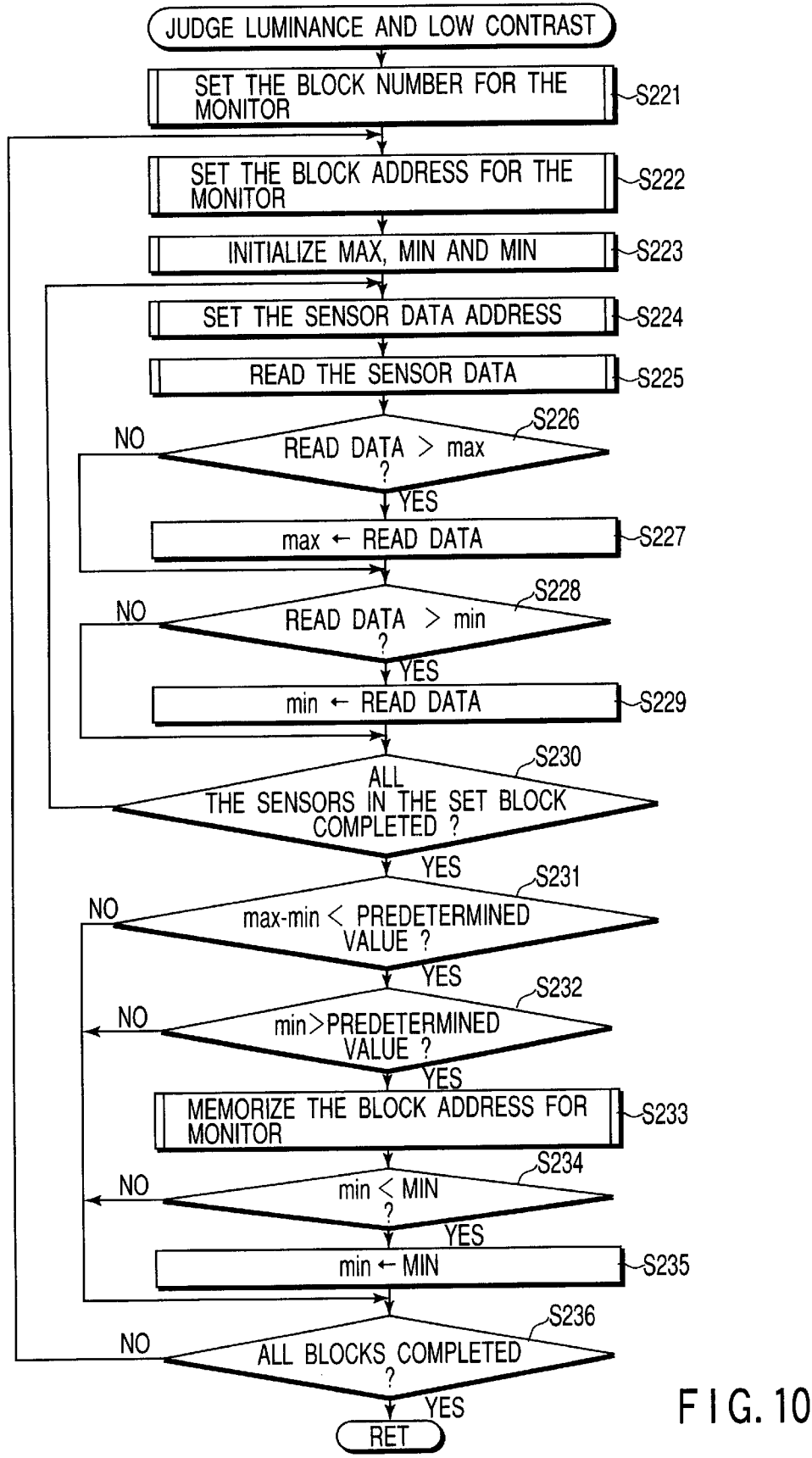
FIG. 10 is a flowchart for explaining a procedure of a low luminance and low contrast judgment sequence according to the second embodiment of the present invention.

Next, by referring to the flowchart of FIG. 10, there will be explained the procedure of the low luminance and low contrast judgment sequence according to the second embodiment of the present invention.

In the beginning, the number of small blocks for the setting of the monitor is set (step S221).

Then, the head RAM address of the sensor data is set in the small blocks for the setting of the monitor which data is stored in the RAM of the CPU 6.

Here, adjacent blocks will be subsequently set (step S222).

Next, the maximum value max and the minimum value min of the sensor data in the small blocks for the setting of the monitor and the minimum value MIN of the sensor data in the monitor region 74 are initialized (step S223).

Here, when max=0 is set and the sensor data is eight bit data, min and MIN=FFH is set.

Subsequently, the RAM address of the sensor data read at step S225 is set.

Here, the adjacent sensor data is subsequently set (step S224).

Then, the sensor data of the RAM address set at step S224 is read (step S225).

Then, the sensor data read at step S225 is larger than the maximum value max of the sensor data in the small block for the monitor setting which has been set, the process proceeds to step S227. In the case where the sensor data is smaller, the process proceeds to step S228 (step S226).

Then, the current sensor data is stored in the max (step S227).

Subsequently, when the sensor data read at step S225 is smaller than the minimum value min of the sensor data in the small block for the setting of the monitor currently set, the process proceeds to step S229. In the case where the sensor data is larger, the process proceeds to step S230 (step S228).

Then, the current sensor data is stored in the min (step S229).

Furthermore, judgment is made as to whether the detection of the maximum value and the minimum value is completed with respect to the small block for the monitor setting currently set.

Then when the detection is completed, the process proceeds to step S231. When the detection is not completed, the process returns to step S224 (step S230).

Subsequently, the low contrast judgment is conducted with respect to the small block for the setting of the monitor currently set.

In this judgment, when the difference between the maximum value max and the minimum value min of the sensor data in the block is smaller than the predetermined value, it is considered that the contrast is low to proceed to step S232. When the contrast is larger, it is considered that the contrast is not low to proceed to step S236 (step S231).

Then, the low luminance judgment is conducted with respect to the small block for the setting of the monitor which is currently set (step S232).

When the minimum value min of the sensor data in the block is larger than the predetermined value, it is considered that the luminance is low to proceed to step S233. When the luminance is smaller, it is thought that the luminance is not low to proceed to step S236.

In this case, the average value of the sensor data in the block is used in place of the minimum value min.

Subsequently, the head RAM address of the sensor data in the small block for the setting of the monitor currently set is memorized as the data of the low luminance and low contrast block (step S233).

Then, judgment is made as to whether the minimum value min of the sensor data in the small blocks for the setting of the monitor is smaller than the minimum value MIN of the sensor data in the monitor region 74 (step S234). When the minimum value is smaller, the process proceeds to step S235. When the minimum value is larger, the process proceeds to step S236.

Next, the data of the minimum value min of the sensor data in the small block for the setting of the monitor which value is currently set is stored in the minimum value MIN of the sensor data in the monitor region 74 (step S235).

Then, with respect to the small blocks for the setting of all the monitors, judgment is made as to whether the low luminance and low contrast setting is completed (step S236).

When the judgment is completed, the process returns. When the judgment is not completed, the process returns to step S222.

As has been explained above, according to the second embodiment, since the auxiliary light integration is conducted without being affected by the light source at the background, the contrast of the main subject is obtained even in the photography against the background of the night scene with the result that the main subject can be measured in a high precision.

Third Embodiment

Next, a third embodiment of the present invention will be explained.

Figure 11:
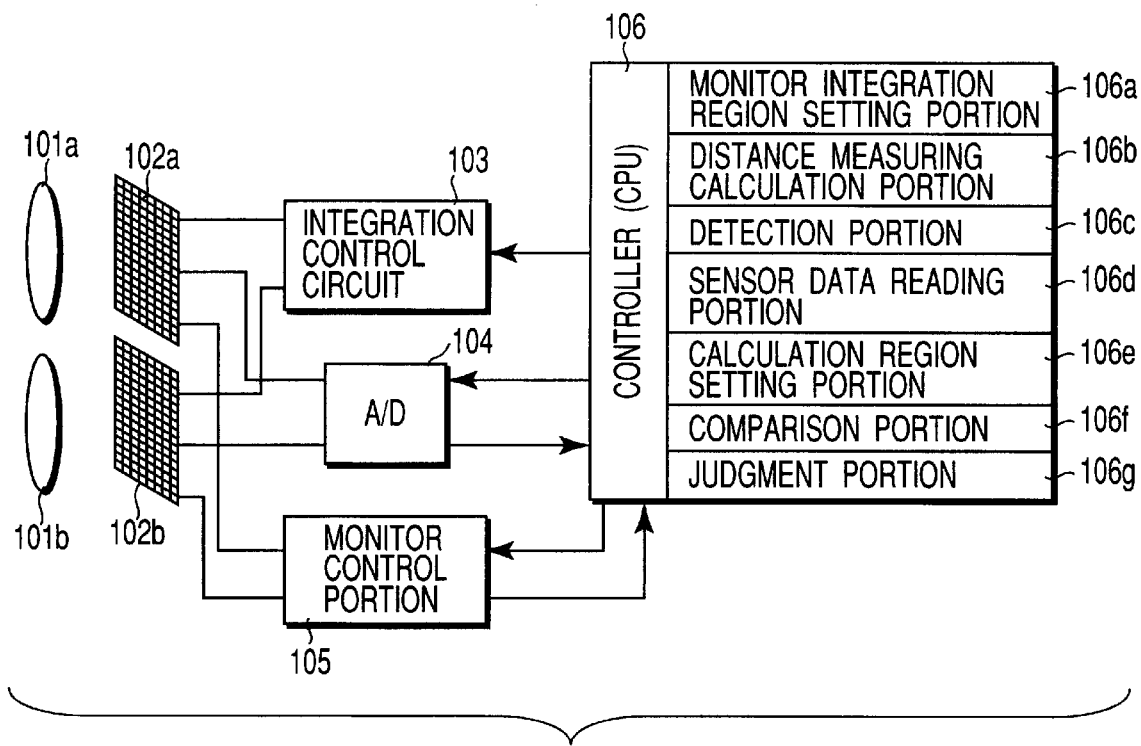
FIG. 11 is a block diagram showing a structure of a distance measuring apparatus according to a third embodiment of the present invention.

The third embodiment is such that in place of the line sensor according to the first and the second embodiment, the area sensors 102a and 102b are adopted which are shown in FIG. 11.

The distance measuring sequence and the low luminance and low contrast judgment sequence are the same as in the first and the second embodiment.

Here, FIG. 11 is a block diagram showing a structure of the distance measuring apparatus according to the third embodiment.

As shown in FIG. 11, the pair of light receiving lenses 101a and 101b are arranged.

At the rear of the light receiving lenses 101a and 101b, a pair of area sensors 102a and 102b are arranged.

Then, the outputs of the pair of area sensors 102a and 102b are connected to the inputs of the A/D converter circuit 104 and the monitor control circuit 105, and the outputs of these A/D conversion circuit 104 and the monitor control circuit 105 are connected to the input of the CPU 106.

Furthermore, the output of the CPU 106 is connected to the inputs of the area sensors 102a and 102b via the integration control circuit 103.

In such a structure, the subject image is formed on the pair of area sensors 102a and 102b with the pair of light receiving lenses 101a and 101b.

Then, in the pair of area sensors 102a and 102b, the formed subject image is photoelectrically converted in accordance with the light intensity and is converted into an electric signal.

At this time, the integration operation of the pair of area sensors 102a and 102b is controlled by the integration control circuit 103.

The analog electric signal which has photoelectrically converted the subject image output from the pair of area sensors 102a and 102b is A/D converted with the A/D conversion circuit 104, and is sent to the controller (CPU) 106 as a digital signal.

Furthermore, the subject luminance information during the integration operation is monitored with the monitor control circuit 105 so that the setting of the monitor region and the monitor signal are output to the controller (CPU) 106.

Here, the controller (CPU) 106 conducts various calculations such as an output of signal and the calculation of the subject distance.

Here, the controller (CPU) 106 has a monitor region selection portion 106a, the distance calculation portion 106b and a detection portion 106c.

The above pair of area sensors 102a and 102b photoelectrically converts the subject image to output the subject image signal corresponding to the luminance distribution.

The above monitor region setting portion 106a sets the monitor region at the time of integration of the pair of area sensors 102a and 102b.

The above distance measuring calculation portion 106b conducts distance measuring calculation corresponding to the region including the monitor region set by the monitor region setting portion 106a.

The above detection portion 106c detects a certain region which is low in luminance and low in contrast based on the subject image signal.

The monitor region setting portion 106a sets as a second monitor region the region low in luminance and low in contrast which is detected in the detection portion 106c out of the first monitor region set at the first time.

The above pair of area sensors 102a and 102b conducts the first and the second integration corresponding to the first and the second monitor regions set by the above monitor region setting portion 106a.

Furthermore, the controller (CPU) 106 has the monitor region setting portion 106a, the sensor data reading portion 106d, the detection portion 106c, the calculation region setting portion 106e, the comparison portion 106f and the judgment portion 106g.

In this case as well, the above pair pf area sensors 102a and 102b photoelectrically converts the subject image to output the subject image signal corresponding to the luminance distribution.

That is, the above monitor region setting portion 106a sets the monitor region at the time of integration by the above pair of area sensors 102a and 102b.

The above sensor data reading portion 106d reads the sensor data at the time of the integration by the pair of area sensors 102a and 102b.

The above detection portion 106c detects the maximum value out of the sensor data read by the sensor data reading portion 106d.

The above calculation region setting portion 106e sets as the calculation region the region including the monitor region set by the monitor region setting portion 106a.

The above comparison portion 106f compares the maximum value of the sensor data detected by the detection portion 106c with the predetermined value.

In the case where the above comparison portion 106f obtains a comparison result showing that the maximum value of the sensor data is larger than the predetermined value, the judgment portion 106g judges as to whether a portion having a low luminance and low contrast is present in the sensor data read with the sensor data reading portion.

In the case where the above judgment portion 106g judges that a portion having a low luminance and low contrast is present in the sensor data, the monitor region setting portion 106a sets as a second monitor region the portion having the low luminance and low contrast out of the first monitor region set at the first time.

The above pair of area sensors 102a and 102b conducts the first and the second integration corresponding to the first and the second monitor regions set by the above monitor region setting portion 106a.

Figure 12:
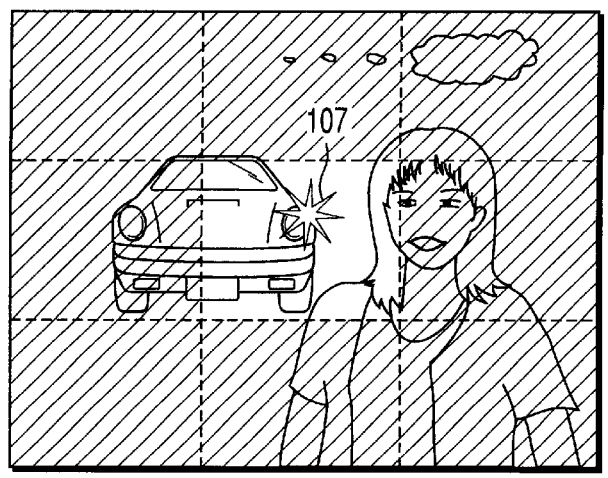
FIG. 12 is a view showing a setting example of a monitor region according to a third embodiment of the present invention.

Then, FIG. 12 is a view showing a setting example of the monitor region according to this third embodiment.

In other words, FIG. 12 is a view showing a field of view within the photographing screen of each block in the case where the number of blocks for the setting of the monitor region is 9.

The dot line in FIG. 12 denotes a boundary of each block, and reference numeral 107 denotes reflection light such as sunlight or the like which is reflected at the high reflection portion of the automobile at the background.

In the photographing scene shown in FIG. 12, the other subject becomes low in contrast when the whole screen is set in the monitor region under the influence of the reflection light 107 such as sun light or the like reflected at a high reflection portion of the automobile at the background.

Then, according to third embodiment, in the same manner as the first and the second embodiments, a relatively low luminance and low cost region is detected with respect to the reflection light. The slanted line portion is set in the monitor region to conduct the second integration.

Incidentally, the block for the setting of the monitor region may be continuously set as described above, or may be set so that the adjacent block setting ranges partially overlap with each other, or may be set in a dispersing manner.

Besides, it goes without saying that the block can be set in 1 centimeter unit like the first embodiment.

As has been explained above, according to the third embodiment, even in the case where the area sensor is used as a distance-measuring sensor, the same advantage can be obtained in the same manner as in the line sensor.

Incidentally, in FIGS. 1 and 11, as shown in a description in a bracket, in the case where reference numerals 6a or 106a are set as an integration region setting portion for setting the integration region of the sensors (1a and 1b or 101a and 101b) and, at the same time, the distance calculation is conducted corresponding to a region including the integration region set with the integration calculation setting portions 6a or 106a, and furthermore, the detection portion 6c or 106c detects a low luminance and low contrast region on basis of the subject image signal output from the above sensors (1a and 1b or 101a and 106a), a distance measuring apparatus can be realized in which the integration region setting portion 6a or 106a sets as the second integration region the low luminance and low contrast region detected with the detection portion out of the first integration region which is a region set at the first time, and above sensors 1a and 1b or 101a and 101b conduct the first integration and the second integration corresponding to the first and the second integration region set with the above integration region setting portion 6a or 106a.

As has been described above, according to the distance measuring apparatus and the distance measuring method of the camera according to the present invention, it becomes possible to measure a distance to the main subject with certitude without depending upon the relatively high luminance subject with respect to the main subject.

Consequently, as has been described in detail, according to the present invention, a distance measuring apparatus and a distance measuring method can be provided which are capable of measuring the distance without depending upon the state of the high luminance portion at the background.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measuring apparatus comprising:

a sensor for photoelectrically converting a subject image to output a subject image signal corresponding to a luminance distribution;

a detecting portion for detecting a region having a low luminance and a low contrast based on the subject image signal;

a monitor region setting portion which sets a monitor region at the time of integration by the sensor and for setting as a second monitor region the region having a low luminance and a low contrast detected by the detecting portion out of a first monitor region set at a first time;

a distance measuring calculation portion for calculating distance measurement in correspondence to a subject image signal of a region including the first and second monitor regions set with the monitor region setting portion; and a selecting portion for selecting designated data from data related to the subject image distance calculated by the distance measuring calculating portion.

2. The distance measuring apparatus according to claim 1, wherein the selection portion selects data corresponding to the nearest distance out of the data with respect to the subject distance.

3. The distance measuring apparatus according to claim 1, further comprising a first sensor sensitivity setting portion for setting the sensor sensitivity of the first integration.

4. The distance measuring apparatus according to claim 3, wherein the first sensor sensitivity setting portion selects a sensor sensitivity out of a plurality of sensor sensitivities.

5. The distance measuring apparatus according to claim 1, further comprising a second sensor sensitivity setting portion for setting the sensor sensitivity of the second integration.

6. The distance measuring apparatus according to claim 5, wherein the second sensor sensitivity setting portion sets the sensor sensitivity of the second integration based on the maximum value of the sensor data obtained in the first integration.

7. The distance measuring apparatus according to claim 5, wherein the second sensor sensitivity setting portion sets the sensor sensitivity of the second integration based on the average value of the low luminance and low contrast region.

8. The distance measuring apparatus according to claim 1, further comprising a light-emitting portion for emitting auxiliary light; and a judgment portion for judging whether or not the auxiliary light emission by the light-emitting portion is required.

9. The distance measuring apparatus according to claim 8, wherein the judgment portion judges whether or not the auxiliary light emission by the light-emitting portion is required based on the minimum value of the sensor data in the second monitor region.

10. The distance measuring apparatus according to claim 8, wherein the judgment portion judges whether or not the light emission by the light-emitting portion is required based on the minimum value of the sensor data in the second monitor region.

11. The distance measuring apparatus according to claim 8, wherein the light emitting portion is a strobe light emitting portion.

12. The distance measuring apparatus according to claim 8, wherein the light emitting portion is at least one of an LED and a lamp.

13. The distance measuring apparatus according to claim 8, wherein the sensor is a line sensor.

14. The distance measuring apparatus according to claim 8, wherein the sensor is an area sensor.

15. A distance measuring apparatus comprising:
   a sensor for photoelectrically converting a subject image to output a subject image signal corresponding to a luminance distribution;
   a monitor region setting portion for setting a monitor region at the time of integration by the sensor;
   a sensor data reading portion for reading sensor data at the time of integration by the sensor;
   a detection portion for detecting a maximum value out of the sensor data read with the sensor data reading portion;
   a calculation region setting portion for setting a region including the monitor region set with the monitor region setting portion as the calculation region;
   a comparison portion for comparing the maximum value of the sensor data detected with the detection portion with a predetermined value; and
   a judgment portion for judging whether or not a low luminance and low contrast portion is present in the sensor data read with the sensor data reading portion in the case where the comparison portion obtains a comparison result showing that the maximum value of the sensor data is larger than the predetermined value;
   wherein the monitor region setting portion sets as a second monitor region the low luminance and low contrast portion out of the first monitor region which is set at the first time in the case where the judgment portion judges the low luminance and low contrast portion is present in the sensor data,
   the sensor conducts the first and the second integration corresponding to the first and the second monitor regions set with the monitor region setting portion.

16. The distance measuring apparatus according to claim 15, wherein the judgment portion does not judge as to whether a portion having a low luminance and a low contrast is present in the case where the comparison portion obtains a comparison result showing that the maximum value of the sensor data is smaller than a predetermined value.

17. The distance measuring apparatus according to claim 15, wherein the monitor region setting portion does not set the second monitor region in the case where judgment is made that the sensor data does not has the low luminance and low contrast portion.

18. The distance measuring apparatus according to claim 15, wherein the second monitor region is a region narrower than the first monitor region.

19. A distance measuring method using a distance measuring apparatus for measuring a distance based on sensor data obtained by the integration control of a sensor, the method comprising the steps of:
   conducting a first integration with a monitor region for the first integration, and a sensor sensitivity for the first integration;
   conducting a first calculation based on the first sensor data obtained with the first integration;
   detecting a low luminance and low contrast region based on the first sensor data;
   setting the low luminance and low contrast region detected in the detection as a monitor for the second integration to conduct the second integration with the monitor region for the second integration and the sensor sensitivity for the second integration;
   conducting the second calculation based on the second sensor data obtained with the second integration; and
   selecting desired data out of the calculation data calculated in the first and the second calculation.

20. A distance measuring method using a distance measuring apparatus for determining a subject distance based on the sensor data obtained by the integration control of the sensor, the method comprising the steps of:
   conducting a first integration with the monitor region for the first integration and the sensor sensitivity for the first integration;
   calculating the subject distance data by the first calculation based on the first sensor data obtained with the first integration;
   detecting a low luminance and low contrast region based on the first sensor data;
   setting the low luminance and low contrast region detected in the detection as the monitor region for the second integration to conduct a second integration with the monitor region for this second integration and the sensor sensitivity for the second integration;
   calculating the subject distance data from the second calculation based on the second sensor data obtained with the second integration; and
   selecting desired data out of the subject distance data calculated in the first and the second calculation.

21. The method according to claim 20, the selecting step selects the data corresponding to the shortest distance out of the subject distance data as distance measurement data.

22. The method according to claim 21, wherein the sensor is a line sensor.

23. The method according to claim 20, wherein the sensor is an area sensor.

24. A distance measuring apparatus comprising:
   a sensor for photoelectrically converting a subject image to output a subject image signal corresponding to a luminance distribution;
   an integration region setting portion for setting the integration region of the sensor;
   a distance measuring calculation portion for calculating the distance measurement corresponding to a region including an integration region set with the integration region setting portion; and
   a detection portion for detecting a low luminance and low contrast region based on the subject image signal output from the sensor;
   wherein the integration region setting portion sets as a second integration region the low luminance and low contrast region detected with the detection portion out of the first integration region set at the first time; and
   the sensor conducts the first and the second integration in correspondence to the first and the second integration region set with the integration regions setting portion.

* * * * *